(12) United States Patent
Colson et al.

(10) Patent No.: US 7,831,462 B2
(45) Date of Patent: Nov. 9, 2010

(54) METHOD AND APPARATUS FOR DISTRIBUTING TARGETED AUDIBLE ADVERTISEMENTS AS RINGTONES

(75) Inventors: James C. Colson, Austin, TX (US); Brian Lee White Eagle, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 428 days.

(21) Appl. No.: 11/936,566

(22) Filed: Nov. 7, 2007

(65) Prior Publication Data
US 2009/0119164 A1    May 7, 2009

(51) Int. Cl.
*G06F 17/00* (2006.01)
(52) U.S. Cl. .................. 705/10; 705/14.49; 705/14.58; 705/14.64; 705/14.69; 455/207.16; 379/82; 379/106.5; 379/106.9; 379/179
(58) Field of Classification Search .................. 705/10, 705/14; 455/207.16; 379/82, 179, 106.5, 379/106.9
See application file for complete search history.

(56) References Cited

U.S. PATENT DOCUMENTS

| | | | |
|---|---|---|---|
| 4,811,382 A | 3/1989 | Sleevi | |
| 5,428,670 A | 6/1995 | Gregorek et al. | |
| 6,157,814 A * | 12/2000 | Hymel et al. | 340/7.56 |
| 7,317,383 B2 * | 1/2008 | Ihara et al. | 340/435 |
| 7,509,149 B2 * | 3/2009 | Shim et al. | 455/567 |
| 7,548,915 B2 * | 6/2009 | Ramer et al. | 1/1 |
| 7,602,901 B1 * | 10/2009 | Kates et al. | 379/373.01 |
| 2004/0180700 A1 | 9/2004 | Hubbe et al. | |
| 2006/0041474 A1 * | 2/2006 | Westling et al. | 705/14 |
| 2006/0262924 A1 * | 11/2006 | Weiss et al. | 379/413.01 |
| 2007/0093242 A1 | 4/2007 | Small et al. | |
| 2007/0112977 A1 | 5/2007 | Hornal et al. | |
| 2007/0116227 A1 * | 5/2007 | Vitenson et al. | 379/207.02 |
| 2008/0189329 A1 * | 8/2008 | Weaver | 707/104.1 |
| 2009/0154680 A1 * | 6/2009 | Weiss et al. | 379/207.16 |
| 2010/0027776 A1 * | 2/2010 | Stifelman et al. | 379/207.16 |

FOREIGN PATENT DOCUMENTS

| | | |
|---|---|---|
| FR | 2860943 A1 | 4/2005 |
| JP | 2006301734 | 11/2006 |
| WO | 9605684 A1 | 2/1996 |
| WO | 2006115842 A2 | 11/2006 |

OTHER PUBLICATIONS

No author; South Africa—MTN launchesd CallerTunez service; Nov. 21, 2005; Telecompaper Africa/Asia, dialog copy 1 page.*
THIS IS NOT DPANDORF WORK. CHECK User ID NAME. THANKS.*

* cited by examiner

*Primary Examiner*—Thomas Dixon
(74) *Attorney, Agent, or Firm*—Yee & Associates, P.C.; David A. Mims, Jr.

(57) ABSTRACT

The illustrative embodiments described herein provide a method, apparatus, and computer program product for distributing targeted audible advertisements as ringtones. A user profile associated with a user is identified. An audible advertisement is selected from a plurality of audible advertisements using criteria matching the user profile. A currently selected ringtone is substituted with the audible advertisement on a communication device associated with the user.

20 Claims, 6 Drawing Sheets

METHOD AND APPARATUS FOR DISTRIBUTING TARGETED AUDIBLE ADVERTISEMENTS AS RINGTONES

CROSS REFERENCE TO RELATED APPLICATION

The present invention is related to the following patent application: entitled "Method and Apparatus for Playing Audible Advertisements on a Communication Device", Ser. No. 11/936,571, filed even date hereof, assigned to the same assignee, and incorporated herein by reference.

BACKGROUND OF THE INVENTION

1. Field of the Invention

The present invention relates generally to a method for targeting advertisements to a specific demographic. Still more particularly, the present invention relates to a method and a computer program product for substituting targeted audible advertisements in place of a ringtone on a user's communication device.

2. Description of the Related Art

Mobile devices are ubiquitous and popular. Mobile devices may include, for example, mobile phones and personal digital assistants that are capable of wireless connections. Advertisers would like to leverage this ubiquity while continuing to target advertisements to individuals. Additionally, advertisers would like to leverage location information to help target the advertisements.

Several factors complicate the goals of the advertiser to exploit this mobile ubiquity. For example, mobile devices are small with limited display capability and limited and/or expensive bandwidth. The conventional means by which advertisers have exploited mobile devices include embedding advertising into visual content, such as advertisements on a web page. This approach has been met with great resistance by the end user because of the limitations of the display and the associated drawbacks on the end user's bandwidth. An end user, as referenced herein, is the person or persons who will be using a particular technology and for whom it is designed.

Another approach that has been met with mixed results is to deliver short message service (SMS) text, often called text messaging, with targeted advertising based on an end user's location. This approach has the downside of being intrusive because the end user spends time opening and reading the text message with the expectation that it is from a friend or colleague.

One possible approach to a less intrusive targeted advertising model is to allow users to "shop" for free ring tones that contain embedded advertisements. Upon acquisition and installation of an advertisement laden ringtone, the end user is presented with an audible advertisement as a prelude to the standard ring process. The downside of this approach is that the advertiser is dependent on a shopping process initiated by the end user.

SUMMARY OF THE INVENTION

The illustrative embodiments described herein provide a method, apparatus, and computer program product for distributing targeted audible advertisements as ringtones. A user profile associated with a user is identified. An audible advertisement is selected from a plurality of audible advertisements using criteria matching the user profile. A currently selected ringtone is substituted with the audible advertisement on a communication device associated with the user.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
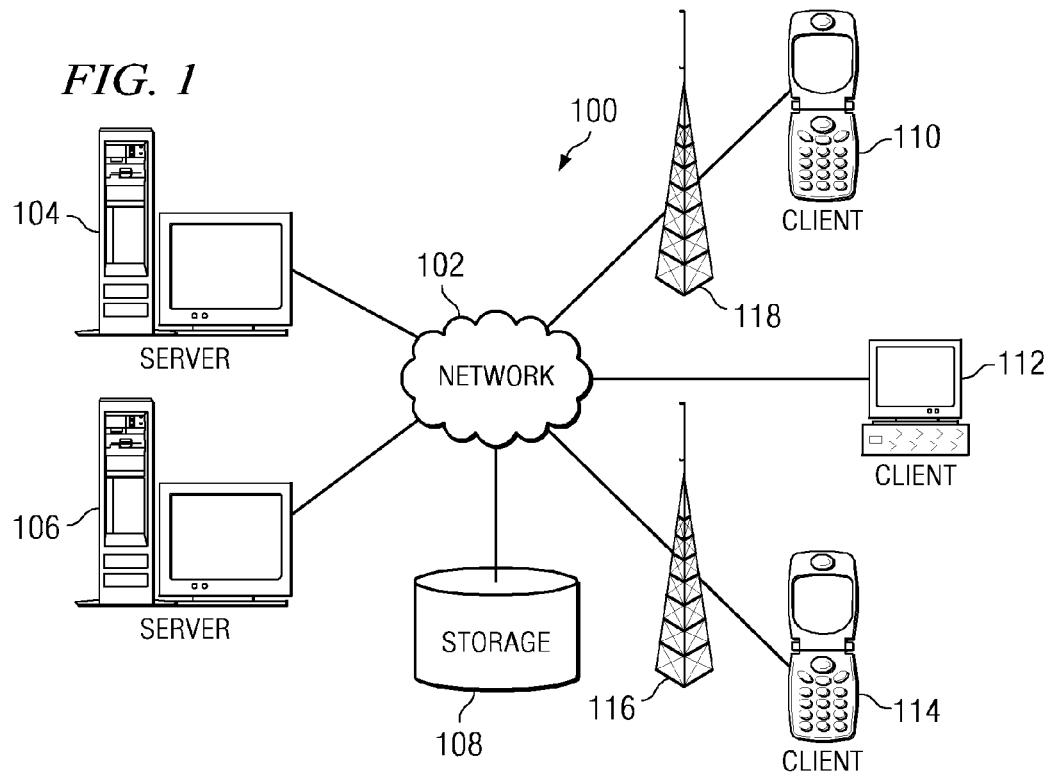
FIG. 1 is a pictorial representation of a network of data processing systems and communication devices in which illustrative embodiments may be implemented.
Figure 2:
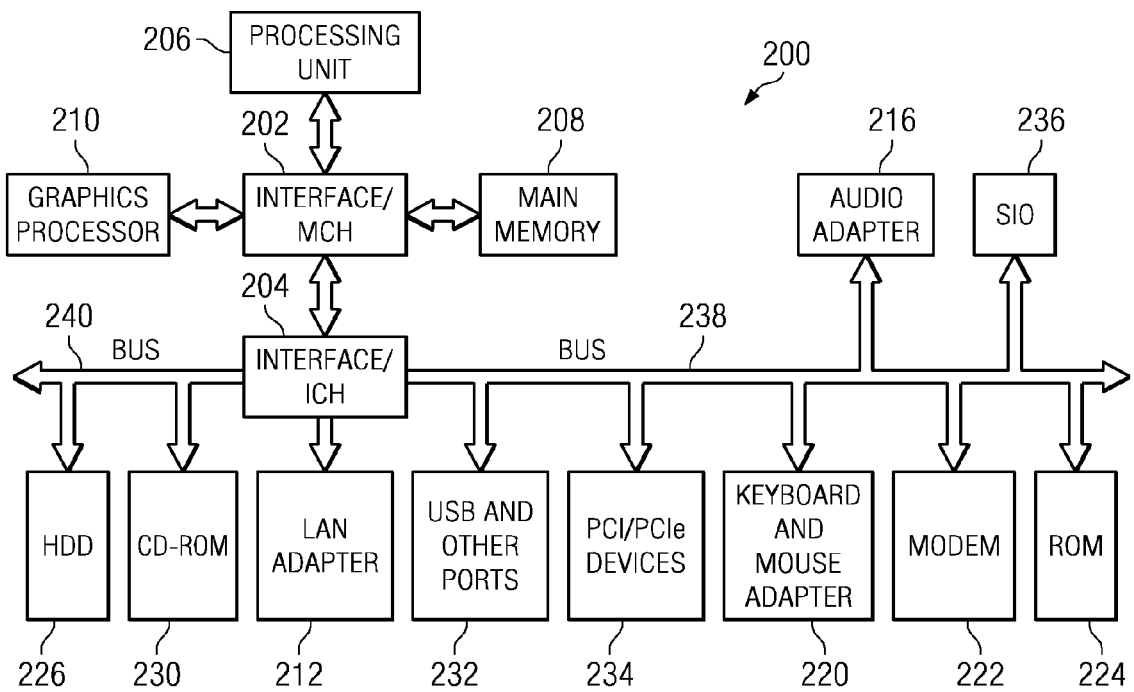
FIG. 2 is a block diagram illustrating a data processing system in which illustrative embodiments may be implemented.

With reference now to the figures, and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, fiber optic cables, or wireless communication links, such as radio towers 116, and 118.

In the depicted example, server 104 and server 106 connect to network 102 along with storage unit 108. In addition, clients 110, 112, and 114 connect to network 102. Clients 110, 112, and 114 may be, for example, personal computers, network computers, personal digital assistants (PDA), cellular communication devices, and wired communication devices. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

The illustrative embodiments, described herein, distribute targeted audible advertisements from a server, such as server 104, over a network, such as network 102, to a client, such as client 110. The process in the different examples substitutes a currently selected ringtone with a targeted audible advertisement on a communication device associated with the user.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including interface and memory controller hub (interface/MCH) 202 and interface and input/output (I/O) controller hub (interface/ICH) 204. Processing unit 206, main memory 208, and graphics processor 210 are coupled to interface and memory controller hub 202. Processing unit 206 may contain one or more processors and even may be implemented using one or more heterogeneous processor systems. Graphics processor 210 may be coupled to the interface/MCH through an accelerated graphics port (AGP), for example.

In the depicted example, local area network (LAN) adapter 212 is coupled to interface and I/O controller hub 204 and audio adapter 216, keyboard and mouse adapter 220, modem 222, read only memory (ROM) 224, universal serial bus (USB) and other ports 232, and PCI/PCIe devices 234 are coupled to interface and I/O controller hub 204 through bus 238, and hard disk drive (HDD) 226 and CD-ROM 230 are coupled to interface and I/O controller hub 204 through bus 240.

PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to interface and I/O controller hub 204.

An operating system runs on processing unit 206 and coordinates and provides control of various components within data processing system 200 in FIG. 2. The operating system may be a commercially available operating system such as Microsoft® Windows Vista™ (Microsoft and Windows Vista are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache such as found in interface and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
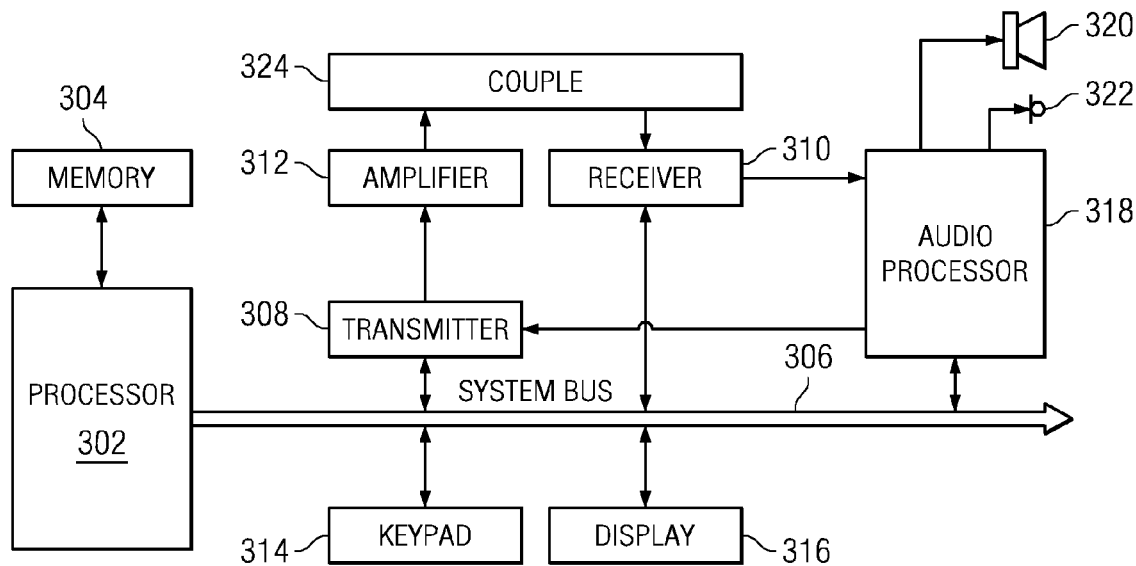
FIG. 3 is a block diagram illustrating a communication device in which illustrative embodiments may be implemented.

FIG. 3 is an exemplary block diagram of a wireless communication device in which illustrative embodiments may be implemented. Wireless communication device 300 includes processor 302 for controlling the operation of the communication device and memory 304. Processor 302 may be a general-purpose microprocessor operating under the control of instructions stored in a memory, such as memory 304, or device-specific circuitry for controlling the operation of the telephone device. Processor 302 is connected by system bus 306 to transmitter 308, receiver 310, keypad 314, display 316, and audio processor 318. Keypad 314 may be a keypad and/or buttons. Display 316 may be any type of display device including a liquid crystal display (LCD) or other known displays, such as a cathode ray tube or active matrix display.

Transmitter 308 and receiver 310 are coupled to a telephone signal by couple 324 to provide full duplex communication. The telephone signal may be provided by a telephone line (not shown) in a land-based telephone or an antenna, such as for a wireless telephone. Audio processor 318 provides basic analog audio outputs to speaker 320 and accepts analog audio inputs from microphone 322. Received signals are demodulated and decoded by receiver 310. Transmitter 308 encodes and modulates signals passed to it by processor 302 or audio processor 318. The output of the transmitter is amplified by power amplifier 312 to control the power level at which the signal is transmitted.

Processor 302 or audio processor 318 may detect audible call status information and call status codes received by receiver 310. Memory 304 may include a lookup table associating call status information or call status codes with visual call status information, such as text messages. Processor 302 detects or receives a call status code and displays an appropriate call status message on display 316. Those of ordinary skill in the art will appreciate that the hardware depicted in FIG. 3 may vary.

The illustrative embodiments recognize the disadvantages of the current methods being employed by advertisers, such as, but not limited to, limited display capability and limited and/or expensive bandwidth. Additionally, the illustrative embodiments further recognize disadvantages associated with the current method of requiring users to initiate the shopping process for advertisement laden ringtones, such as, but not limited to, the advertisers inability to target a specific demographic or a specific location.

Thus, the illustrative embodiments described herein provide a computer implemented method, apparatus, and computer program product for distributing targeted audible advertisements. A user profile associated with a user is identified. An audible advertisement is selected from a plurality of audible advertisements using criteria matching the user profile. A currently selected ringtone is substituted with the audible advertisement on a communication device associated with the user.

The above process is performed without any need for end user action. Thus, the illustrated embodiments provide a method for targeting audible advertisements to a specific demographic in a non-intrusive manner.

In the illustrative examples, a ringtone is defined as a sound file associated with alerting a user of an incoming message or call. Examples of ringtones may include, but are not limited to, cellular phone ringtones, email alerts, instant messaging alerts, or a voice-over-internet protocol (VoIP) alert. An advertisement, as referenced herein, is the promotion of a specific product or service.

Figure 4:
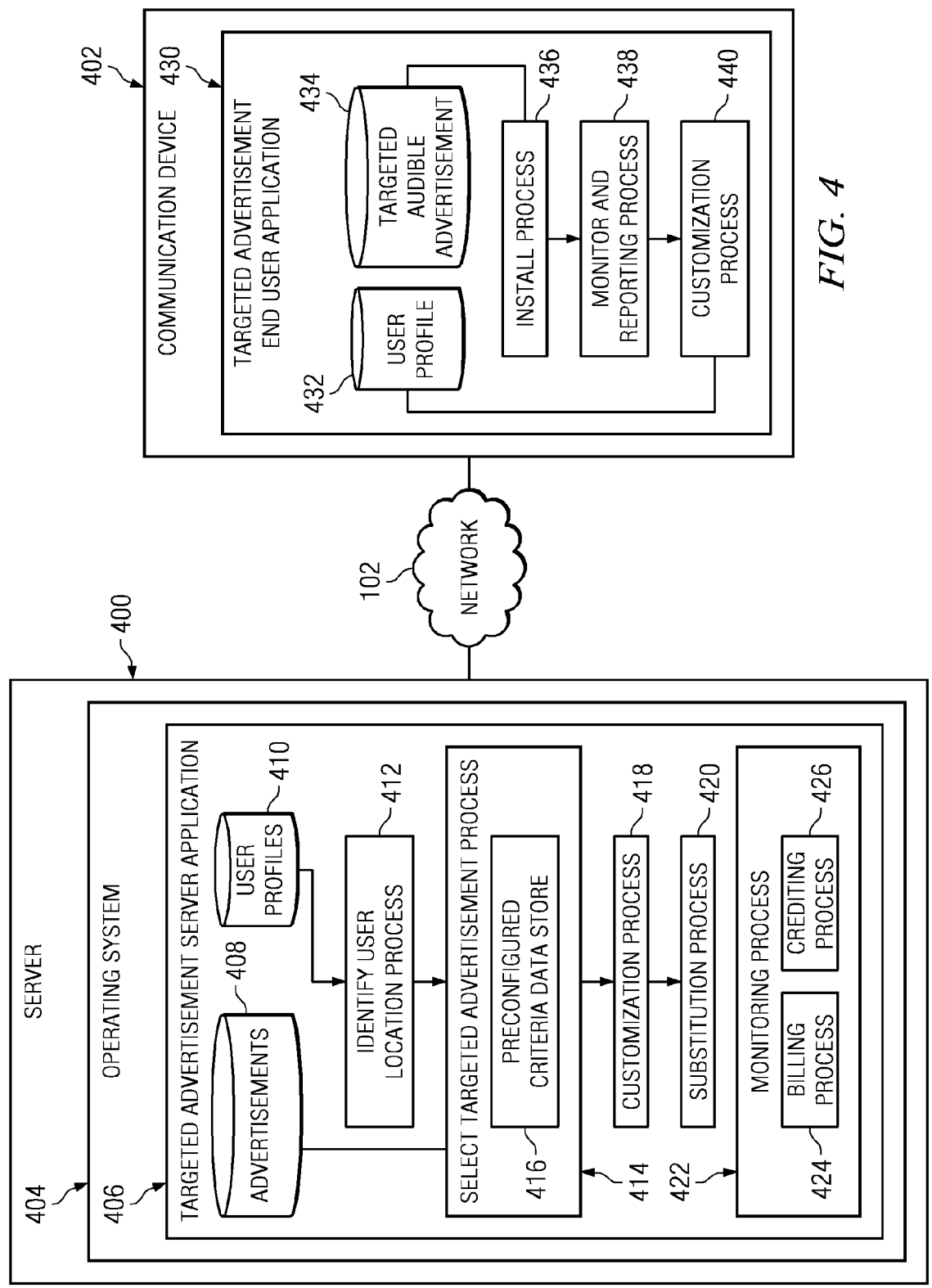
FIG. 4 is a block diagram illustrating the components of a targeted advertisement application in accordance with an illustrative embodiment.

With reference to FIG. 4, a block diagram illustrating the components of a targeted advertisement application in accordance with an illustrative embodiment is presented. FIG. 4 depicts server 400 communicating with communication device 402 over a network, such as network 102 as shown in FIG. 1. Server 400 may be implemented in a data processing system, such as server 104 shown in FIG. 1 or data processing system 200 shown in FIG. 2. Communication device 402 may be implemented in a data processing system or a wireless communication device, such as wireless communication device 300 in FIG. 3.

Operating system 404 runs on server 400. Operating system 404 may be implemented using any commercially available operating system, such as, for example, Microsoft® Windows Server® operating systems. Targeted advertisement server application 406 runs on operating system 404. In these examples, targeted advertisement server application 406 includes advertisements data store 408, user profiles data store 410, identify user location process 412, select targeted advertisement process 414, preconfigured criteria data store 416, customization process 418, substitution process 420, and monitoring process 422.

Targeted advertisement server application 406 stores or communicates with advertisements data store 408 and user profiles data store 410. Advertisements data store 408 contains a plurality of audible advertisements targeted to a specific demographic. Targeted advertisement server application 406 has identify user location process 412 that identifies the location of the communication device currently being used as the medium for presenting the audible advertisement.

Select targeted advertisement process 414 selects a targeted advertisement for a user using a preconfigured criterion matching the user's profile. The criterion may be selected from a set of criteria stored in a data store, such as preconfigured criteria data store 416.

In one illustrative embodiment, customization process 418 customizes the selected audible advertisement to the user. For example, customization process 418 may insert a greeting with the user's name prior to playing the selected audible advertisement. Additionally, customization process 418 may also insert other user specific information directly into the selected audible advertisement, such as, inserting the name of a pet associated with the user as part of a selected audible advertisement pertaining to pet products or services.

Substitution process 420 initiates the process of substituting the user's ringtone with the selected audible advertisement. Substitution process 420 sends the selected audible advertisement to a user's communication device, such as communication device 402. Additionally, substitution process 420 may initiate the install process of replacing the current ringtone with a selected audible advertisement on the user's communication device. The selected audible advertisement will play in response to receiving a call on the user's communication device or at a predetermined time.

Alternatively, the user's communication device may store the selected audible advertisement in a data store of audible advertisements, such as targeted audible advertisement data store 434. In addition, the user's communication device may also initiate install process 436, at a predetermined time, to replace the current ringtone with a selected audible advertisement.

In another illustrative embodiment, targeted advertisement server application 406 may contain monitoring process 422. Monitoring process 422 may remotely monitor the usage of the selected audible advertisement. The monitored data may include, but is not limited to, the length of time the user allows the audible advertisement to play prior terminating the audible advertisement, and the number of times a selected audible advertisement has been played. The audible advertisement may be terminated by, but not limited to, answering an incoming call or by depressing a key on the communication device.

Monitoring process 422 may contain crediting process 426. Crediting process 426 uses the monitored data to credit an account associated with the user as an incentive for users to listen to the audible advertisements. Service providers may provide other incentives, such as, but not limited to, free service, extra minutes, or entering the user into promotional contests. The amount of minutes associated with free service may be tied to the number of times a user listens to the audible advertisements. In one illustrative embodiment, monitoring process 422 may require the user to perform a particular action with the communication device to ensure that the user is in fact listening to the audible advertisements.

Similarly, monitoring process 422 may contain billing process 424. Billing process 424 may bill advertisers of the selected audible advertisement for the number of times users listen to the targeted audible advertisement. In one illustrative embodiment, billing process 424 may provide advertisers with information concerning the effectiveness of their audible advertisements. For example, billing process 424 may report the percentage of users that listen to a particular advertisement until completion, or the percentage of users that interact with a particular audible advertisement.

The caller may interact with the audible advertisement in a number of ways, such as, but not limited to, conducting a dialog, wherein the caller responds to prompts presented as part of the audible advertisement. Additionally, the selected audible advertisement may allow the caller to press a key to connect directly to a service that is being advertised or may request the caller to respond to a question by pressing a key. The interaction may also be in the form of a verbal response to a question or a prompt.

With reference now to communication device 402, communication device 402 contains targeted advertisement end user application 430. Targeted advertisement end user application 430 may store a user profile associated with communication device 402 in a data store, such as user profile data store 432. In one illustrative embodiment, targeted advertisement end user application 430 sends the user profile to server 400 in response to a request for a new audible advertisement or in response to a request from server 400 for the user profile.

Targeted advertisement end user application 430 receives the selected audible advertisement from server 400 over network 102. In one illustrative embodiment, targeted advertisement end user application 430 initiates install process 436 at the time of receiving a selected audible advertisement from server 400. Install process 436 installs and replaces the current ringtone with the selected audible advertisement on communication device 402. Alternatively, the process may be initiated by server 400 remotely.

In another illustrative embodiment, targeted advertisement end user application 430 may store the selected audible advertisement in targeted audible advertisement data store 434. Targeted advertisement end user application 430 may initiate the install process at a later time. By storing the selected audible advertisements locally, targeted advertisement end user application 430 is able to rotate selected audible advertisements without having to request a new selected audible advertisement from server 400 each time.

Additionally, by enabling the local storage of selected audible advertisements, server 400 may send a particular audible advertisement to a plurality of users without having to flood the network. The audible advertisement may be configured to play prior to a major event. Examples of major events may be, but are not limited to, a sporting event or the premier of a new show. Targeted advertisement end user application 430 stores this particular audible advertisement in targeted audible advertisement data store 434. Targeted advertisement end user application 430 installs and plays this particular audible advertisement at a predetermined time prior to the major event occurring.

In another illustrative embodiment, targeted advertisement end user application 430 implements monitoring and reporting process 438. Monitoring and reporting process 438 locally monitors the usage of the selected audible advertisement. The monitored data includes, but is not limited to, the length of time the user allows the audible advertisement to play prior to terminating the audible advertisement, and the number of times a selected audible advertisement has been played. Monitoring and reporting process 438 may send the monitored data at a predetermined time based on a predetermined configuration, such as, but not limited to, when the number of audible advertisements that have been played reaches a preconfigured threshold value or when the network bandwidth is low.

In another illustrative embodiment, as an alternative to server 400 performing the function of customizing the selected audible advertisement, targeted advertisement end user application 430 may contain customization process 440. Customization process 440 customizes the selected audible advertisement to the user. For example, customization process 440 may insert a greeting with the user's name prior to playing a selected audible advertisement.

Figure 5:
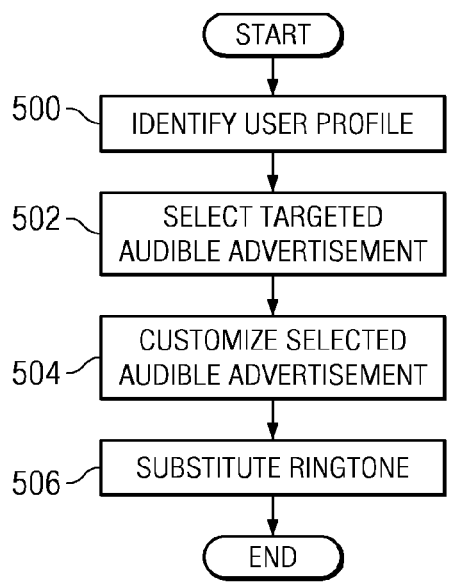
FIG. 5 is a flowchart illustrating a process for substituting targeted audible advertisements in place of a ringtone in accordance with an illustrative embodiment.

With reference now to FIG. 5, a flowchart illustrating a process for substituting targeted audible advertisements in place of a ringtone is presented in accordance with an illustrative embodiment. The process in FIG. 5 may be implemented by a server application, such as target advertisement server application 406 in FIG. 4.

The process begins by identifying a user profile associated with a user (step 500). The user profile may be stored locally in a data store of user profiles, such as user profiles data store 410 shown in FIG. 4. Additionally, the user profile may contain the user location or the user location may be determined remotely through a network. Alternatively, the user profile may be stored locally on a communication device and a remote request may be initiated to retrieve the user profile and the current location of the communication device.

A targeted audible advertisement is selected for the user based on a preconfigured criterion matching the user's profile (step 502). The selected audible advertisement may then be customized prior to sending the selected audible advertisement to the user's communication device (step 504). A currently selected ringtone on a communication device associated with the user is replaced with the selected audible advertisement (step 506), with the process terminating thereafter.

In these examples, the current selected ringtone is the ring tone that is selected for use with an incoming call. The currently selected ringtone may be different depending on the caller. For example, a particular caller may have a different ring tone from other callers. This ringtone may be considered the currently selected ringtone and may also be replaced. The installation of the selected audible advertisement may be performed remotely or may be initiated by the receiving communication device at a predetermined time.

Figure 6:
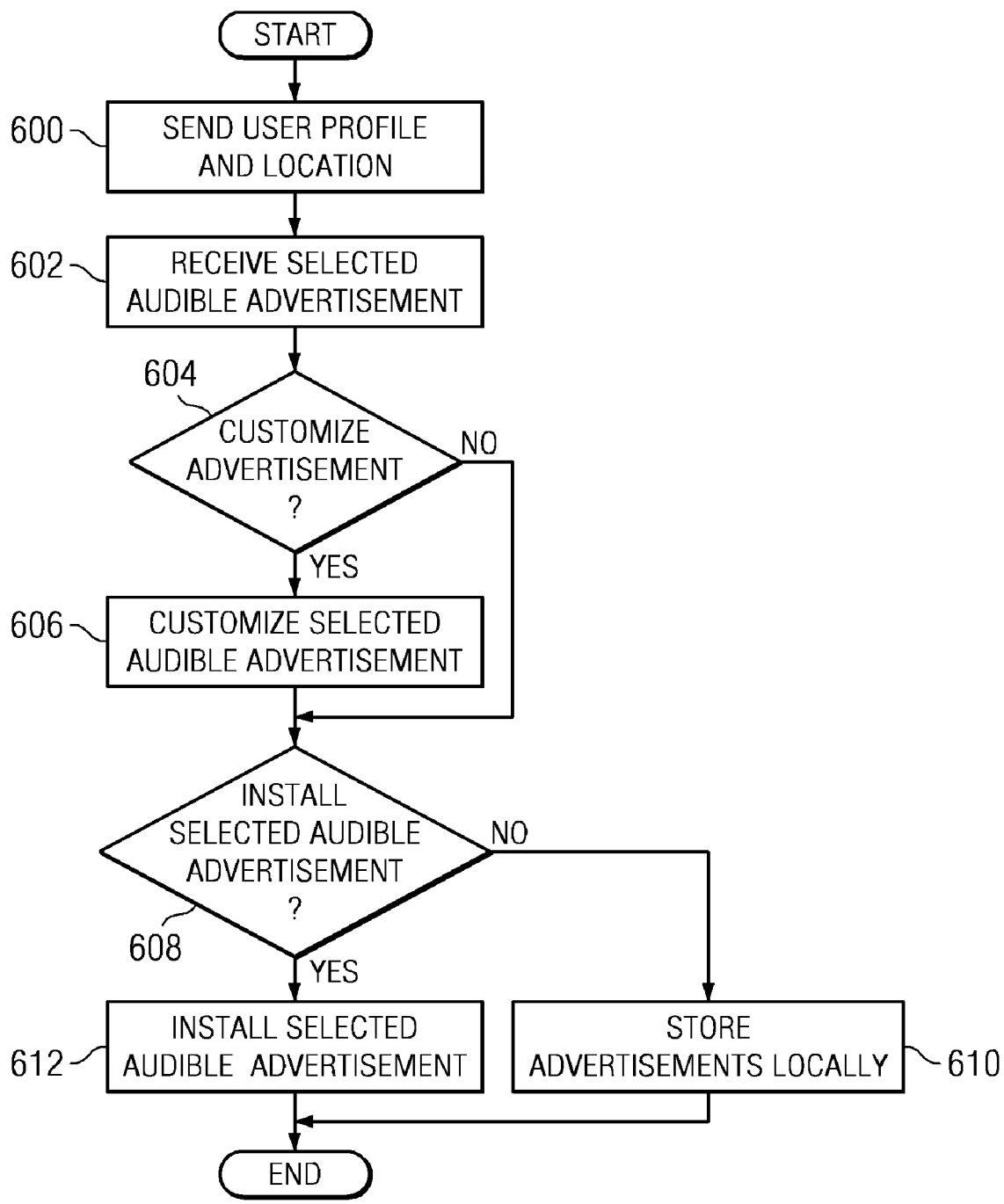
FIG. 6 is a flowchart illustrating a process for installing targeted audible advertisements in place of a ringtone in accordance with an illustrative embodiment.

With reference now to FIG. 6, a flowchart illustrating a process for installing targeted audible advertisements in place of a ringtone is depicted in accordance with an illustrative embodiment. The process in FIG. 6 may be implemented by a communication device application, such as targeted advertisement end user application 430 in FIG. 4.

The process begins by sending a user profile stored locally on a communication device and the current location of the communication device to a server, such as server 400 in FIG. 4 (step 600). Step 600 may be initiated by a communication device or initiated in response to a request from a server. Alternatively, step 600 may be omitted when a server stores the user profile and location data in a data store locally on the server.

A communication device receives a selected audible advertisement targeted to the demographic of a specific user of the communication device (step 602). The process determines whether the selected audible advertisement is customized (step 604). If the selected audible advertisement requires customization or is capable of being customized, the selected audible advertisement is customized to the specific user (step 606). The process determines whether the selected audible advertisement is installed on the user's communication device as the ringtone (step 608). If the selected audible advertisement is not immediately installed as the ringtone, the selected audible advertisement is stored locally on the user's communication device (step 610) and may be installed at a later predetermined time. Otherwise, the selected audible advertisement is installed on the user's communication device as the ringtone to alert the user of an incoming message or call (step 612), with the process terminating thereafter.

Figure 7:
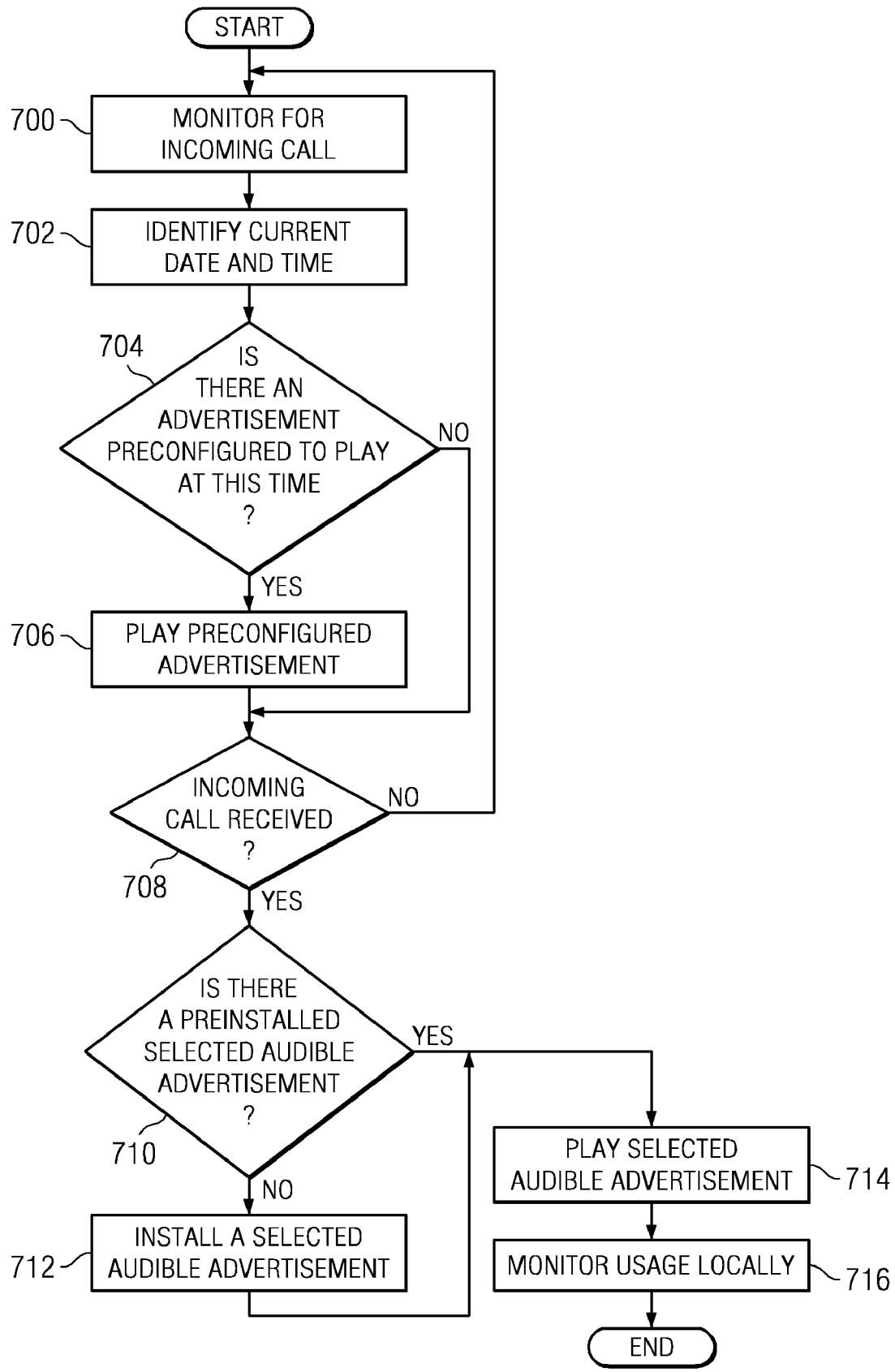
FIG. 7 is a flowchart illustrating a process for playing targeted audible advertisements in accordance with an illustrative embodiment.

FIG. 7 is a flowchart illustrating a process for playing targeted audible advertisements in accordance with an illustrative embodiment. The process in FIG. 7 may be implemented by a communication device application, such as targeted advertisement end user application 430 in FIG. 4.

The process begins by monitoring for an incoming call (step 700). The current date and time is identified (step 702). The process determines whether there is a selected audible advertisement preconfigured to play at the current date and time (step 704). For example, a selected audible advertisement may be configured to play at a predetermined time prior to a major sporting event. If a selected audible advertisement is configured to play at the current date and time, the process plays the preconfigured advertisement (step 706). The process then determines if an incoming call is received (step 708). If an incoming call is not received, the process returns to step 700 to monitor for incoming calls.

If an incoming call is received at step 708, the process determines if there is a preinstalled selected audible advertisement (step 710). If a selected audible advertisement is not preinstalled, the process installs a selected audible advertisement (step 712). The installed selected audible advertisement may be from a local data store of selected audible advertisements or a remote data store of audible advertisement. The process then plays the installed selected audible advertisements (step 714). Information relating to the usage of the selected audible advertisement is monitored (step 716), with the process terminating thereafter.

Figure 8:
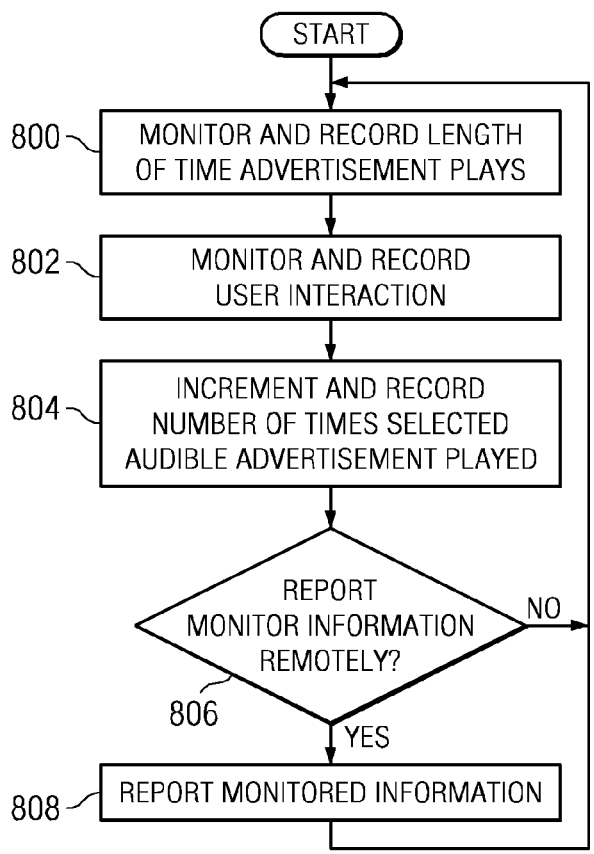
FIG. 8 is a flowchart illustrating a process for locally monitoring the usage of selected audible advertisements in accordance with an illustrative embodiment.

FIG. 8 is a flowchart illustrating a process for locally monitoring the usage of selected audible advertisements in accordance with an illustrative embodiment. The process in FIG. 8 may be implemented by a communication device application, such as targeted advertisement end user application 430 in FIG. 4.

The process begins by monitoring and recording the length of time a selected audible advertisement plays prior to a user terminating the selected audible advertisement (step 800). This information may be used to effectively credit the user's account and bill the advertisers. The user may terminate the selected audible advertisement by answering the incoming call or by depressing a key on the communication device. In addition, the process may perform certain actions based on the monitored data. For example, if only a part of the selected audible advertisement is played prior to the user answering the incoming call, the selected audible advertisement may remain as the user's ringtone until a determination has been made that the entire audible advertisement has been played.

Additionally, the process monitors and records any interaction between the caller and the selected audible advertisement (step 802). The caller may interact with the audible advertisement in a number of ways, such as, but not limited to, conducting a dialog, wherein the caller responds to prompts presented as part of the audible advertisement. Additionally, the selected audible advertisement may allow the caller to press a key to connect directly to a service that is being advertised or may request the caller to respond to a question by pressing a key. The interaction may also be in the form of a verbal response to a question or a prompt.

The process increments and records the number of times a selected audible advertisement has been played (step 804). The process then determines whether the monitored information is reported remotely (step 806). The determination may be made based on a preconfigured parameter such as, but not limited to, when the number of audible advertisements that have been played reaches a preconfigured threshold value or when the network bandwidth is low.

If the process determines not to report the monitored information, the process returns to step 800. If the process determines to report the monitored information, the monitored information is reported remotely to a server (step 808), with the process returning to step 800.

Figure 9:
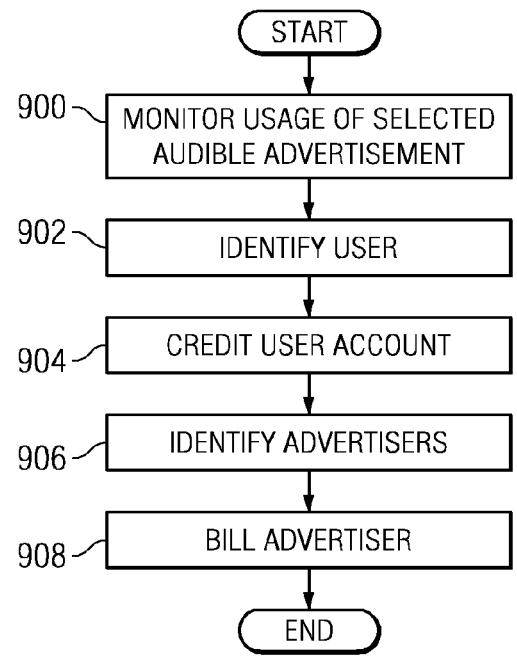
FIG. 9 is a flowchart illustrating a process for remotely monitoring the usage of selected audible advertisements in accordance with an illustrative embodiment.

With reference now to FIG. 9, a flowchart illustrating a process for remotely monitoring the usage of selected audible advertisements in accordance with an illustrative embodiment is presented. The process in FIG. 9 may be implemented by a server application, such as target advertisement server application 406 in FIG. 4.

The process begins by monitoring the usage of selected audible advertisements to determine the qualitative and quantitative effectiveness of the selected audible advertisement (step 900). The monitored information may include, but is not limited to, the length of time the user allows the audible advertisement to play prior to the user terminating the audible advertisement and the number of times a selected audible advertisement has been played. Additionally, other aspects of the selected audible advertisement may be determined, such as, but not limited to, whether the user interacts with the selected audible advertisement, or whether the user calls a phone number or visits a website associated with the selected audible advertisement.

Furthermore, the monitoring process may be performed remotely, or information from a communication device may be requested by the server. Alternatively, a communication device may routinely send locally monitored information to a remote server at preconfigured intervals.

The user data associated with the monitored data, retrieved at step 900, is identified (step 902). The user data may include, but is not limited to, the user's name, address, and telephone number. Additionally, the process may store the user data in a user data store.

As part of the incentive for users to listen to a selected audible advertisement, an account associated with the user is credited based on the monitored information (step 904). The credit may be a monetary and/or a non-monetary benefit, such as, but not limited to, receiving award points redeemable for certain products or services.

Similarly, the advertisers associated with the monitored data, retrieved at step 900, are identified (step 906). The advertisers are billed for the advertising service (step 908), with the process terminating thereafter. Billing may be based on a flat rate or at a rate based on the monitored usage data.

The flowchart and block diagrams in the figures illustrate the architecture, functionality, and operation of possible implementations of systems, methods and computer program products according to various embodiments. In this regard, each step in the flowchart or block diagrams may represent a module, segment, or portion of code, which comprises one or more executable instructions for implementing the specified logical function(s). It should also be noted that, in some alternative implementations, the functions noted in the step may occur out of the order noted in the figures. For example, two steps shown in succession may, in fact, be executed substantially concurrently, or the steps may sometimes be executed in the reverse order, depending upon the functionality involved.

Thus, the illustrative embodiments described herein provide a method, apparatus, and computer program product for distributing targeted audible advertisements as ringtones. A user profile associated with a user is identified. An audible advertisement is selected from a plurality of audible advertisements using criteria matching the user profile. A currently selected ringtone is substituted with the audible advertisement on a communication device associated with the user.

The above process may be performed without any need for end user action. Thus, the process is not dependent on user initiation. Therefore, the illustrated embodiments provide a method for targeting audible advertisements to a specific demographic in a non-intrusive manner. Furthermore, advertisers may target audible advertisements to a specific demographic and/or a specific location.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in a data processing system for distributing targeted audible advertisements, the computer implemented method comprising:
   identifying, by the data processing system, a user profile associated with a user;
   selecting, by a processing unit communicatively coupled to the data processing system, an audible advertisement from a plurality of audible advertisements using criteria matching the user profile to form a selected audible advertisement; and
   substituting a currently selected ringtone with the selected audible advertisement on a communication device associated with the user.

2. The computer implemented method of claim 1, wherein the step of identifying a user profile further comprises:
   identifying a user location.

3. The computer implemented method of claim 1, wherein the steps of identifying, selecting, and substituting are performed without any user interaction.

4. The computer implemented method of claim 1, further comprising:
   customizing the selected audible advertisement to the user.

5. The computer implemented method of claim 1, further comprising:
   billing an advertiser associated with the selected audible advertisement.

6. The computer implemented method of claim 1, further comprising:
   initiating playing of the selected audible advertisement at a predetermined time.

7. The computer implemented method of claim 1, further comprising:
   initiating playing of the selected audible advertisement in response to receiving a call.

8. The computer implemented method of claim 1, further comprising:
   monitoring a length of time and a number of times in which the selected audible advertisement is played to form a set of monitored data.

9. The computer implemented method of claim 8, further comprising:
   crediting an account associated with the user using the set of monitored data.

10. The computer implemented method of claim 7, further comprising:
    conducting a dialog with the caller, wherein the caller responds to prompts presented as part of the selected audible advertisement.

11. A computer program product comprising:
    a non-transitory computer usable medium including computer usable program code for distributing targeted audible advertisements, said computer program product comprising:
    computer usable program code for identifying a user profile associated with a user;
    computer usable program code for selecting an audible advertisement from a plurality of audible advertisements using criteria matching the user profile to form a selected audible advertisement; and computer usable program code for substituting a currently selected ringtone with the selected audible advertisement on a communication device associated with the user.

12. The computer program product of claim 11, wherein the computer usable program code for identifying a user profile further comprises:

computer usable program code for identifying a user location.

13. The computer program product of claim 11, wherein the computer usable program code for identifying, selecting, and substituting are performed without any user interaction.

14. The computer program product of claim 11, further comprising:

computer usable program code for customizing the selected audible advertisement to the user.

15. The computer program product of claim 11, further comprising:

computer usable program code for billing an advertiser associated with the selected audible advertisement.

16. The computer program product of claim 11, further comprising:

computer usable program code for initiating playing of the selected audible advertisement at a predetermined time.

17. The computer program product of claim 11, further comprising:

computer usable program code for initiating playing of the selected audible advertisement in response to receiving a call.

18. The computer program product of claim 11, further comprising:

computer usable program code for monitoring a length of time and a number of times in which the selected audible advertisement is played to form a set of monitored data.

19. The computer program product of claim 18, further comprising:

computer usable program code for crediting an account associated with the user using the set of monitored data.

20. An apparatus comprising:

a bus system;

a communications system connected to the bus system;

a memory connected to the bus system, wherein the memory includes computer usable program code; and a processing unit connected to the bus system, wherein the processing unit executes the computer usable program code to identify a user profile associated with a user; select an audible advertisement from a plurality of audible advertisements using criteria matching the user profile to form a selected audible advertisement; and substitute a currently selected ringtone with the selected audible advertisement on a communication device associated with the user.

* * * * *